(12) United States Patent
Lee et al.

(10) Patent No.: US 8,259,576 B2
(45) Date of Patent: Sep. 4, 2012

(54) METHOD AND APPARATUS FOR PERFORMING INTERRUPT COALESCING

(75) Inventors: Kok Lim Patrick Lee, Penang (MY); Lu Chin Seng, Penang (MY)

(73) Assignee: Intel Corporation, Santa Clara, CA (US)

( * ) Notice: Subject to any disclaimer, the term of this patent is extended or adjusted under 35 U.S.C. 154(b) by 861 days.

(21) Appl. No.: 11/728,074

(22) Filed: Mar. 23, 2007

(65) Prior Publication Data
US 2008/0235424 A1     Sep. 25, 2008

(51) Int. Cl.
*H04L 12/26*     (2006.01)
(52) U.S. Cl. .......................................... 370/235
(58) Field of Classification Search .................. 370/235, 370/229, 351, 389, 392, 412; 710/1, 22, 710/260, 264, 265
See application file for complete search history.

(56) References Cited

U.S. PATENT DOCUMENTS

| | | | |
|---|---|---|---|
| 6,349,391 B1 * | 2/2002 | Petivan et al. ................. | 714/11 |
| 6,438,633 B1 * | 8/2002 | Stone ............................ | 710/107 |
| 6,587,958 B1 * | 7/2003 | Oshins et al. ................ | 713/502 |
| 6,859,926 B1 * | 2/2005 | Brenner et al. .............. | 718/100 |
| 2002/0141339 A1 * | 10/2002 | Konuma ........................ | 370/229 |
| 2002/0174255 A1 * | 11/2002 | Hayter et al. ................ | 709/250 |
| 2003/0118044 A1 * | 6/2003 | Blanc et al. .................. | 370/414 |
| 2004/0117534 A1 * | 6/2004 | Parry et al. .................. | 710/260 |
| 2004/0165574 A1 * | 8/2004 | Kakumaru et al. .......... | 370/349 |
| 2004/0179523 A1 * | 9/2004 | Maruyama et al. .......... | 370/389 |
| 2005/0141501 A1 * | 6/2005 | Kadambi et al. ............. | 370/389 |
| 2006/0193318 A1 * | 8/2006 | Narasimhan et al. ........ | 370/389 |
| 2007/0143513 A1 * | 6/2007 | Wang et al. .................. | 710/260 |
| 2007/0180134 A1 * | 8/2007 | Steinbach et al. ........... | 709/230 |
| 2008/0155139 A1 * | 6/2008 | Chew ............................ | 710/52 |
| 2008/0219279 A1 * | 9/2008 | Chew ............................ | 370/412 |
| 2008/0301474 A1 * | 12/2008 | Bussa et al. .................. | 713/300 |

* cited by examiner

*Primary Examiner* — Anh-Vu Ly
*Assistant Examiner* — Omar Ghowrwal
(74) *Attorney, Agent, or Firm* — Trop, Pruner & Hu, P.C.

(57) ABSTRACT

In one embodiment, the invention includes a controller that interrupts a CPU based on a counter that uses a decrement step which may increase as high priority data packets are received by the controller.

13 Claims, 2 Drawing Sheets

METHOD AND APPARATUS FOR PERFORMING INTERRUPT COALESCING

BACKGROUND

A high bandwidth gigabit Ethernet ("GigE") controller may implement interrupt coalescing (IC), wherein the controller attempts to group multiple data packets, received in a short period of time, into a single interrupt. Interrupt coalescing may reduce the interrupt processing overhead for the central processing unit ("CPU"). However, IC may also introduce added latency for packets to be processed by the CPU as a result of grouping multiple interrupts into a single delayed interrupt service request.

Conventional IC may be implemented based on several different methods. For example, a first method includes a cyclical interrupt service request to processor. A second method includes a packet to packet delay triggered interrupt. Regarding the first method, a decrement timer may be set to expire after a certain delay from the arrival of a first packet that arrives after the last interrupt service request. For example, the timer may be pre-configured to "40" with a fixed decrement step of "1". After receiving the first packet, the time starts decrementing from "40" to "0" with a fixed decrement step of "1." If this occurs in a in a quality of service ("QOS") environment, whereby different priorities may be assigned to data packets, the first method may essentially decrement with little emphasis placed on the priority of the received packet or packets. Regarding the second method, when a first packet is received, the decrement timer will reset to, for example, "5" and start to count down. If the next packet is received before the timer counts down to zero, then the timer will be reset and start to count down from "5" again, regardless of any priority assigned to the packet in a QOS system. Both of these methods may be deployed to achieve some level of interrupt coalescing in a GigE controller. However, these methods may not be effective if, for example, packets with different priority levels need to be grouped together. Such a condition may result in high priority packets being delayed throughout the scheduled period of interrupt coalescing, which may reduce the effectiveness of QOS.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
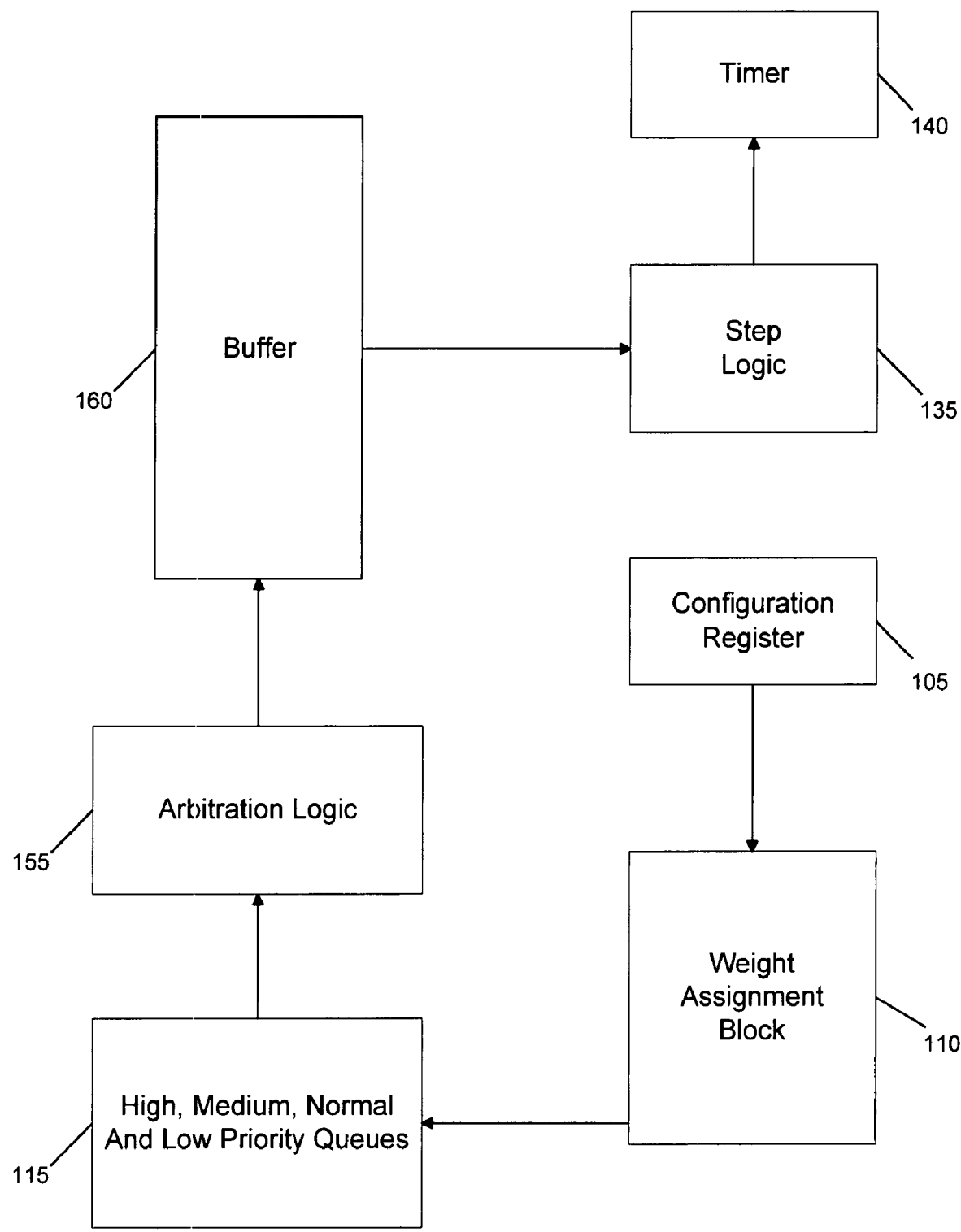
FIG. 1 is a block diagram of a method for IC in an embodiment of the invention.

FIG. 1 is a block diagram regarding a method for IC in an embodiment of the invention. The system 100 may be included in, for example, a GigE controller. The system 100 may include a packet buffer that further includes a configurable weight assignment module 110 and low priority queue, normal priority queue, medium priority queue, and high priority queue 115. The configurable weight assignment module 110 may be shared between low priority queue, normal priority queue, medium priority queue, and high priority queue 115. These queues may couple to arbitration logic 155. In a QOS system, the weight assignment module 110 may be configured to assign weights to packets of varying priority. For example, the weight assignment module 110 may assign a "1" to low priority packets and a "5" to high priority packets. Arbitration logic 155 may be programmed to forward the data packets in various manners. For example, arbitration logic 155 may forward all high priority packets first. However, arbitration logic 155 may instead forward the data packets in the order they are received from the packet buffer.

The system 100 may also include an interrupt coalescing block or aspect. The interrupt coalescing block may include timer decrement computational logic 135 (i.e., step logic), a count down timer 140, a configuration register 105, and a memory buffer 160. The interrupt coalescing block may couple to the packet buffer, a direct memory access ("DMA") interface, and to the central processing unit ("CPU").

As stated above, a weight may be assigned by the configurable weight assignment module 110 to data packets in the high, medium, normal, low priority queues 115. As will be explained in greater detail below, the weight may be used to change a decrement count of the timer 140 in one embodiment of the invention. The configuration register block 105 may be used to configure the weight assignment module 110, which may then assign weights to the packets.

In one embodiment of the invention, whenever IC is enabled a default decrement step may be set by decrement step computational logic 135. After a first packet is received by the system 100, the decrement step may be recalculated based on the weight value of the first packet and other packets stored in the memory buffer 160. The above calculation may be performed by decrement step computational logic 135. The calculation may be based on, as will be further explained below, the average weight of the packets received. The count down timer 140 may then adjust its counter value based on the updated decrement step.

For example, a higher weight value may be assigned to high priority packets using configuration register block 105 and weight assignment block 110. When a high priority packet is received by the system 100, the count down timer 140 may decrement much faster than had it only received low priority packets, which may have lower weight values. A lowest priority packet may decrement the timer in the smallest possible time step, which may be a decrement step of "1" in one embodiment of the invention. For high priority packets, the decrement step may be adjusted to a higher value such as "5." The decrement step may be programmed by writing to a configuration register. In one embodiment of the invention, the decrement step may be reset to "1" once the timer 140 counts down to, for example, zero.

Thus, in one embodiment of the invention, if all the received packets are high priority (e.g., "5"), the count down timer 140 may count down based on a faster decrement step value (e.g., "5") than if all the received packets are low priority. As a result, the interrupt interval to the CPU may be shorter. This may result in a lower latency for a group of high priority packets to interrupt the CPU. If low (e.g., "1") and high priority packets (e.g., "5") are received in a mixed manner, the decrement step value may be modified upon receipt of the high priority packets using the following equation: (Next decrement step)=(Current packet weight+Current decrement step)/(2). However, in other embodiments of the invention if the first packet received is high priority (e.g., "5"), the decrement step value may be set to "5".

Accordingly, various embodiments of the invention may allow a high priority packet to interrupt the CPU for a service request with low latency even if the subsequent received packets are of a lower priority level. In one embodiment of the invention, the new decrement step may be maintained until the next high priority packet is received. In one embodiment of the invention, after such a high priority packet is received, the decrement step value may be increase based on the average of the newly received priority packet and the previous decrement step. In other embodiments of the invention, after such a high priority packet is received, the decrement step value may be set to match the priority level of that single high priority packet.

Figure 2:
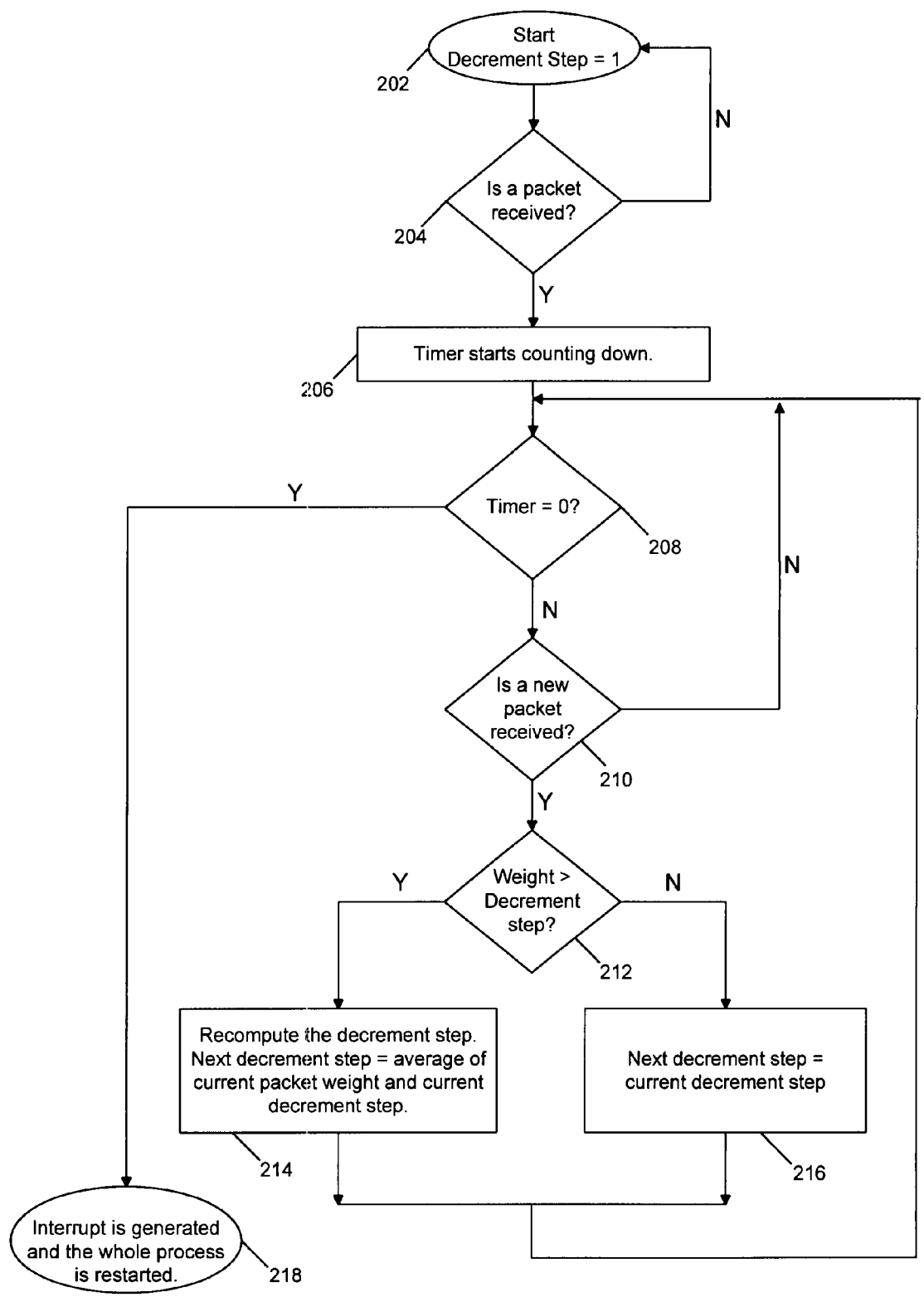
FIG. 2 is a flow chart which describes steps for IC in an embodiment of the invention.

FIG. 2 is a flow chart which describes the steps for IC in an embodiment of the invention. As shown in block 202, the decrement step may be initially set to "1". In block 204, if no packet is received, the decrement step may stay at "1". However, as shown in block 206, if a data packet having a priority level is received, a timer may start counting down. In block 208, the status of the timer may be determined. If the timer has not decremented to its lowest allowable value (e.g., zero), the process may advance to block 210. If the timer has decremented to its lowest allowable value, an interrupt may be generated and the process may repeat, as shown in block 218.

Assuming the timer has not decremented to its lowest allowable value, the status of whether a new packet has been received is determined in block 210. If no new packet has been received, the process returns to block 208. If, however, a second data packet having a second priority level has been received, a determination may be made as to whether the weight of the newly received packet is greater than the existing decrement step. If yes, the process may advance to block 214 and a new decrement step may be calculated according to, for example only, the following formula: (Next decrement step)=(Current packet weight+Current decrement step)/(2). Thus, the timer counter may now be decremented using the newly calculated second decrement step. The second decrement step may be based in part on the priority level of the second packet. The second decrement step may also be based in part on the first decrement step, which was based on the priority level of the first received data packet.

If, however, the weight of the newly received packet is not greater than the existing decrement step, the process may advance to block 216 and the next decrement step may be set to the current decrement step. The process may then return to block 208 from either block 214 or 216.

Thus, in one embodiment of the invention, a low priority packet may be received first. If a decrement step is initially set at "1", the timer 140 (FIG. 1) may begin its count down from, for example, a predetermined counter value such as "40", and the decrement step may be maintained at "1". The initial decrement step of "1" may be manifested in the timer 140 as the time decrements from counter value="40", to counter value="39", to counter value="38", which are separated by a decrement step of "1".

If a high priority packet (e.g., "5") is later received, the next decrement step may be calculated according to the exemplary equations set out above. For example, (Next decrement step)=(5+1)/(2) which results in a new next decrement step of "3". As lower priority packets (e.g., "1" or "2") are received, the next decrement step may be maintained at "3". The "next decrement step" of "3" may be manifested in the timer 140 with counter values="35", "32", "29", "26", and "23", which are separated by decrement steps of "3".

When a higher priority packet (e.g., "5") is later received, the next decrement step may be calculated as, using the above exemplary formula, (5+3)/(2) which results in a new next decrement step of "4". The "next decrement step" of "4" may be manifested in the timer 140 with counter values="19" and "15", which are separated by decrement steps of "4". When another high priority packet (e.g., "5") is later received, the next decrement step may be calculated as, using the above exemplary formula, (5+4)/(2) which results in a new next decrement step of "5", rounded up from "4.5". The "next decrement step" of "5" may be manifested in the timer 140 with counter values="10", "5", and "0", which are separated by decrement steps of "5". Zero indicates the process has decremented to its lowest allowable value, in one particular embodiment of the invention.

Again, the methods and apparatuses described above are merely representative embodiments of the invention, and other embodiments of the invention exist concerning a weighted IC method. For example, a new decrement step may be calculated according to the following formula: (Next decrement step)=(Current packet weight+Preceding packet weight+Current decrement step)/(3), where the "preceding packet weight" refers to the packet weight for the packet received before the currently received packet. Such an embodiment may allow a "next decrement step" to be lower than the "current decrement step."

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for performing interrupt coalescing with a network interface controller, the method comprising:
    processing packets with the network interface controller;
    determining respective quality of service for the packets based on content corresponding to the packets;
    issuing a single interrupt to a processor for the packets, the single interrupt having a time period determined based on the respective quality of service for the packets;
    transmitting the packets via a direct memory access interface coupled to the network interface controller;
    processing additional packets with the network interface controller;
    determining additional respective quality of service for the additional packets based on additional content corresponding to the additional packets; and
    issuing a single additional interrupt to the processor for the additional packets, the single additional interrupt having an additional time period determined based on the additional respective quality of service for the additional packets;
    transmitting the additional packets via the direct memory access interface;

wherein the time period is unequal to the additional time period based on the respective quality of service for the packets being unequal to the additional respective quality of service for the additional packets;

wherein (a) the time period spans a length of time from a beginning of a timer cycle to issuing the single interrupt and (b) the additional time period spans an additional length of time from a beginning of an additional timer cycle to issuing the additional single interrupt.

2. The method of claim 1 including receiving the packets from different queues.

3. The method of claim 1, wherein determining the respective quality of service for the packets includes determining different ones of the packets have different respective quality of service weightings.

4. The method of claim 1, wherein the controller includes a gigabit Ethernet controller and quality of service hardware.

5. The method of claim 1, wherein the content corresponding to the packets is included in the packets.

6. An apparatus comprising:
a memory to receive packets and additional packets; and
a controller, coupled to the memory, to (a) determine respective quality of service for the packets based on content included in the packets; (b) issue a single interrupt service request to a processor for the packets, the single interrupt having a coalescing period determined based on the respective quality of service for the packets; (c) transmit the packets via a direct memory access interface coupled to the controller; (d) determine additional respective quality of service for the additional packets based on additional content included in the additional packets; (e) issue a single additional interrupt service request to the processor for the additional packets, the single additional interrupt having an additional coalescing period determined based on the additional respective quality of service for the additional packets; and (f) transmit the additional packets via the direct memory access interface;
wherein the coalescing period is unequal to the additional coalescing period based on the respective quality of service for the packets being unequal to the additional respective quality of service for the additional packets;
wherein (a) the coalescing period is to span a length of time from a beginning of a timer cycle to issuing the single interrupt and (b) the additional coalescing period is to span an additional length of time from a beginning of an additional timer cycle to issuing the additional single interrupt.

7. The apparatus of claim 6, wherein the controller is to process the packets and the packets are to be sent from different queues.

8. The apparatus of claim 6, wherein the controller is to determine the respective quality of service for the packets based on the controller determining different ones of the packets have different respective quality of service weightings.

9. The apparatus of claim 6, wherein the controller couples to quality of service hardware.

10. An apparatus comprising:
a controller, coupled to a memory, to perform operations comprising:
processing packets;
determining respective quality of service for the packets based on content corresponding to the packets;
issuing a single interrupt to a processor for the packets, the single interrupt having a time period determined based on the respective quality of service for the packets, the processor coupled to the controller;
processing additional packets;
determining additional respective quality of service for the additional packets based on additional content corresponding to the additional packets; and
issuing a single additional interrupt to the processor for the additional packets, the single additional interrupt having an additional time period determined based on the additional respective quality of service for the additional packets;
wherein the time period is unequal to the additional time period based on the respective quality of service for the packets being unequal to the additional respective quality of service for the additional packets;
wherein (a) the time period spans a length of time from a beginning of a timer cycle to issuing the single interrupt and (b) the additional time period spans an additional length of time from a beginning of an additional timer cycle to issuing the additional single interrupt.

11. The apparatus of claim 10, wherein the operations comprise receiving the packets from different queues.

12. The apparatus of claim 10, wherein determining the respective quality of service for the packets includes determining different ones of the packets have different respective quality of service weightings.

13. The apparatus of claim 10, wherein the content corresponding to the packets is included in the packets.

* * * * *